(12) United States Patent
Yoneshima et al.

(10) Patent No.: US 8,794,951 B2
(45) Date of Patent: Aug. 5, 2014

(54) MOLD FOR RESIN MOLDING, METHOD FOR MANUFACTURING MOLD FOR RESIN MOLDING, AND RESIN MOLDED PRODUCT

(75) Inventors: Sadayuki Yoneshima, Hirakata (JP); Masayuki Sakai, Osaka (JP); Hisao Aota, Nara (JP); Hiroshi Watanabe, Higashiosaka (JP); Mitsuaki Samejima, Sakai (JP); Yumiko Omiya, Moriguchi (JP)

(73) Assignee: Tanazawa Hallosha Co., Ltd., Osaka (JP)

( * ) Notice: Subject to any disclaimer, the term of this patent is extended or adjusted under 35 U.S.C. 154(b) by 512 days.

(21) Appl. No.: 12/517,042

(22) PCT Filed: Nov. 21, 2007

(86) PCT No.: PCT/JP2007/072554
§ 371 (c)(1),
(2), (4) Date: May 29, 2009

(87) PCT Pub. No.: WO2008/065946
PCT Pub. Date: Jun. 5, 2008

(65) Prior Publication Data
US 2010/0075149 A1 Mar. 25, 2010

(30) Foreign Application Priority Data
Dec. 1, 2006 (JP) .................. 2006-326258

(51) Int. Cl.
*B29C 33/10* (2006.01)
*B29C 33/40* (2006.01)
*B29C 51/36* (2006.01)

(52) U.S. Cl.
USPC .................. 425/190; 425/405.1; 425/420

(58) Field of Classification Search
USPC .............. 425/190, 420, 812, 405.1; 264/219
See application file for complete search history.

(56) References Cited

U.S. PATENT DOCUMENTS

| 3,804,566 | A | * | 4/1974 | Kimura et al. | ............... 425/28.1 |
| 5,354,195 | A | * | 10/1994 | Dublinski et al. | ............. 425/504 |
| 5,407,610 | A | * | 4/1995 | Kohama et al. | ............... 264/496 |
| 6,189,589 | B1 | * | 2/2001 | Tokunaga et al. | ............. 156/497 |

(Continued)

FOREIGN PATENT DOCUMENTS

| JP | 61-049811 | 3/1986 |
| JP | 8-150624 | 6/1996 |

(Continued)

*Primary Examiner* — Dimple Bodawala
*Assistant Examiner* — Emmanuel S Luk
(74) *Attorney, Agent, or Firm* — Rabin & Berdo, P.C.

(57) ABSTRACT

An object of the present invention is to provide a mold for resin molding which ensures ventilation characteristic without requiring an enormous amount of work.
The mold for resin molding of the present invention includes: a mold 12; a design layer 16 formed inside the mold 12; and a air permeable interposing layer 22 for forming the design layer 16 on an inner surface of the mold 12. The mold 12 forms a ventilating throughhole 14. The design layer 16 is made of a resin having projections and depressions on the surface, and has a ventilating throughhole 18 formed so as to couple to the ventilating throughhole 14. The air permeable interposing layer 22 is arranged next to the inner surface of the mold 12 so that an inner surface of the design layer 16, the ventilating throughhole 18 of the design layer 16, and the ventilating throughhole 14 of the mold 12 couple to each other.

13 Claims, 7 Drawing Sheets

(56) References Cited

U.S. PATENT DOCUMENTS

| | | | |
|---|---|---|---|
| 6,309,587 B1 * | 10/2001 | Gniatczyk et al. | 264/510 |
| 6,749,794 B2 * | 6/2004 | Spengler | 264/458 |
| 6,973,021 B2 * | 12/2005 | Kondo et al. | 369/275.1 |
| 7,192,000 B2 * | 3/2007 | Mak | 249/160 |
| 7,708,544 B2 * | 5/2010 | Pricone | 425/387.1 |
| 7,866,969 B2 * | 1/2011 | Ruiz et al. | 425/129.1 |

FOREIGN PATENT DOCUMENTS

| | | |
|---|---|---|
| JP | 09-057770 | 3/1997 |
| JP | 09-094833 | 4/1997 |
| JP | 2000-289033 | 10/2000 |

* cited by examiner

Fig. 15

MOLD FOR RESIN MOLDING, METHOD FOR MANUFACTURING MOLD FOR RESIN MOLDING, AND RESIN MOLDED PRODUCT

TECHNICAL FIELD

The present invention relates to a mold for resin molding, a method for manufacturing a mold for resin molding, and a resin molded product. In particular, the present invention relates to a mold for resin molding intended for resin molding by vacuum molding to be used when forming a resin molded product that has projections and depressions of grain pattern (such as a leather grain pattern, a texture pattern, a wood grain pattern, a satin-finished pattern, a vein pattern, a scale pattern, a marble pattern, a mirror-like pattern, a paint pattern, and a geometric pattern) on the surface, a method for manufacturing the same, and a resin molded product that is vacuum molded using the mold for resin molding.

BACKGROUND ART

Among molds for resin molding intended for resin molding, there have been suggested dies forming a resin layer.

One example is a mold for resin molding on which a special thermosetting resin layer of grain pattern is formed. This die is fabricated by inverting desired grain from a master, and thus has grain of high precision as compared with etching techniques. This die also provides the effect of thermal insulation which contributes to an improvement in the grain inversion rate during molding and a reduction of weld lines (see Patent Document 1).
[PATENT DOCUMENT 1] Japanese Examined Patent Application Publication No. Heisei 2-14173

DISCLOSURE OF THE INVENTION

Problem to be Solved by the Invention

The die described in Patent Document 1 itself cannot be used for vacuum molding since vacuum dies must have exhaust holes while the grained resin layer formed over the die can block exhaust holes.

Then, in order to secure exhaust holes formed in the die, it is conceivable that the grained resin layer, after formed on the die, could be subjected to the operation of perforation by using wires inserted through the exhaust holes from the back of the die so that holes are made in the same positions as the exhaust holes. Vacuum molding dies have a large number of exhaust holes, however. For example, typical dies of automotive parts have more than 100 exhaust holes. It thus requires an enormous amount of work to apply the foregoing operation to all the exhaust holes.

In addition, the exhaust holes may cause a problem of clogging during vacuum molding, in which case the holes must be cleaned with an enormous amount of work again.

In view of the foregoing, a main object of the present invention is to provide a mold for resin molding which ensures ventilation characteristic without requiring an enormous amount of work, a method for manufacturing the mold for resin molding, and a resin molded product that is molded by using the same.

Means for Solving Problem

A mold for resin molding of the present invention includes: a mold; a design layer formed inside the mold; and a air permeable interposing layer for forming the design layer on an inner surface of the mold. Here, the mold has a ventilating throughhole. The design layer is made of a resin having projections and depressions formed on a surface thereof, and has a ventilating throughhole formed so as to couple (connect) to the ventilating throughhole of the mold. The air permeable interposing layer is arranged next to the inner surface of the mold so that an inner surface of the design layer, the ventilating throughhole of the design layer, and the ventilating throughhole of the mold are coupled (connected) to each other.

A mold for resin molding is further disclosed wherein the design layer is made of a thermosetting resin having a curing temperature of 250° C. or lower.

A mold for resin molding is further disclosed wherein the air permeable interposing layer is bonded to a mold surface of the mold and to the design layer with an adhesive material that makes the design layer.

A mold for resin molding is further disclosed wherein the air permeable interposing layer has an air permeable member containing any one or more of a foamed material, a porous material, and a fibrous material.

A mold for resin molding is further disclosed wherein the air permeable interposing layer has an air permeable member containing any one or more of a foamed material, a porous material, and a fibrous material, the air permeable member being bonded to the mold and to the design layer with an adhesive material.

A mold for resin molding is further disclosed wherein the air permeable interposing layer has an air permeable member, and is bonded with an adhesive for bonding the air permeable interposing layer to the mold and to the design layer, the adhesive being impregnated into the air permeable member.

A mold for resin molding is further disclosed wherein the projections and depressions of the design layer make a grain pattern on the inner surface.

A mold for resin molding is further disclosed wherein the air permeable interposing layer is arranged in a recess formed in part of the mold surface of the mold.

A resin molded product of the present invention is a resin molded product molded by: pouring a melted resin or placing a thermally softened sheet material into the mold for resin molding; and exhausting air through the ventilating throughholes so that the melted resin or the thermally softened sheet material is sucked to the surface of the design layer.

A method for manufacturing a mold for resin molding of the present invention is the method for manufacturing a mold for resin molding including a mold, a design layer formed inside the mold, and a air permeable interposing layer for forming the design layer on an inner surface of the mold, the method including the steps of: forming a ventilating throughhole in the mold; forming the design layer from a resin having projections and depressions formed on a surface thereof; arranging the design layer next to the inner surface of the mold via the air permeable interposing layer so that an inner surface of the design layer, a ventilating throughhole of the design layer, and the ventilating throughhole of the mold are coupled (connected) to each other; and forming the ventilating throughhole in the design layer.

A method for manufacturing a mold for resin molding is further disclosed including the step of forming the air permeable interposing layer, in which an air permeable member containing any one or more of a foamed material, a porous material, and a fibrous material is formed on the inner surface of the mold to make a pore area.

A method for manufacturing a mold for resin molding is further disclosed including the step of forming the air permeable interposing layer, in which a fibrous member such as felt, pulp, or rock wool is applied or pasted to the inner surface of the mold to make a pore area.

A method for manufacturing a mold for resin molding is further disclosed including the step of forming the air permeable interposing layer, in which a mixture of a resin and solid particles is solidified so that the particle-suspending resin creates a pore area to couple (connect) to the ventilating throughholes.

Effect of the Invention

The provision of the air permeable interposing layer eliminates the need to make holes in the same positions as those of the ventilating throughholes previously formed in the die, i.e., those of the exhaust holes. The operation of making the ventilating throughholes, i.e., the holes intended for exhausting can thus be performed relatively easily.

After the formation of the design layer, ventilating throughholes may be perforated in any positions as long as the holes have a depth to reach the air permeable interposing layer. Even if the ventilating throughholes are clogged up during molding, other locations can be readily perforated without hole cleaning.

The foregoing and other objects, features, and advantages of the present invention will become more apparent from the following description of the preferred embodiment of the invention when read in conjunction with the drawings.

EXPLANATION OF LETTERS OR NUMERALS 10 mold for resin molding
12 mold
14 ventilating throughhole
16 design layer
18 ventilating throughhole
20 die surface
22 air permeable interposing layer
24 air permeable member
26 first air permeable adhesive layer
28 first air permeable impregnation layer
30 second air permeable adhesive layer
32 second air permeable impregnation layer
50 prototype
52 reverse mold
54 master mold
56 resin sheet material
58 resin sheet
60 needle

BEST MODE FOR CARRYING OUT THE INVENTION

Figure 1:
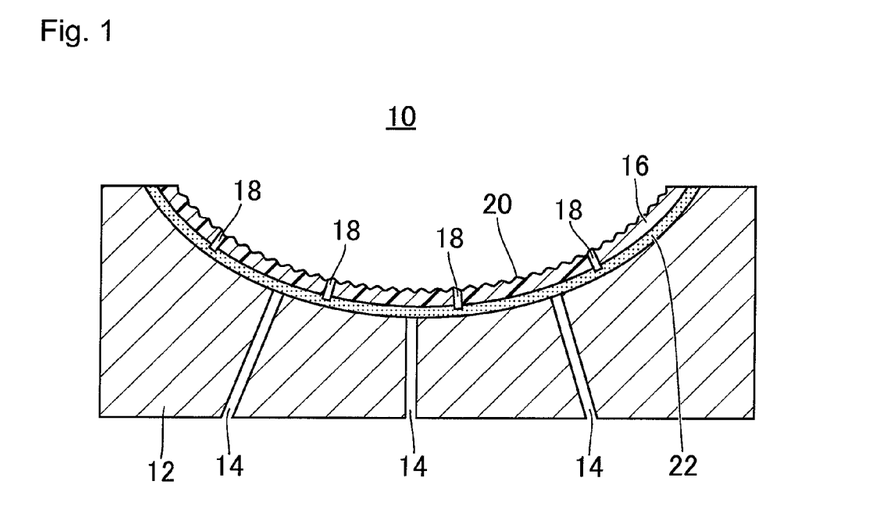
FIG. 1 is a schematic sectional view of a mold for resin molding which is an embodiment of the present invention.
Figure 2:
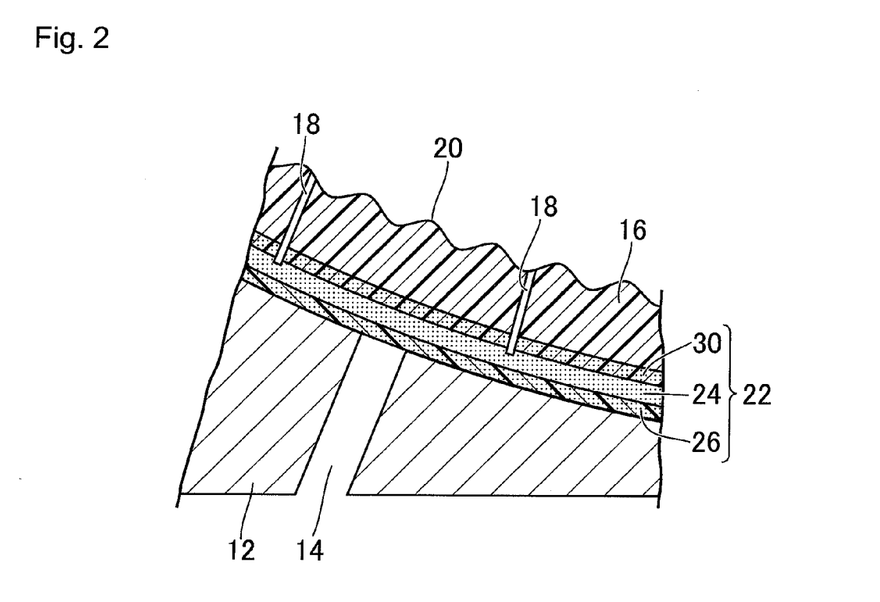
FIG. 2 is an enlarged schematic sectional view of the mold for resin molding shown in FIG. 1.
Figure 3:
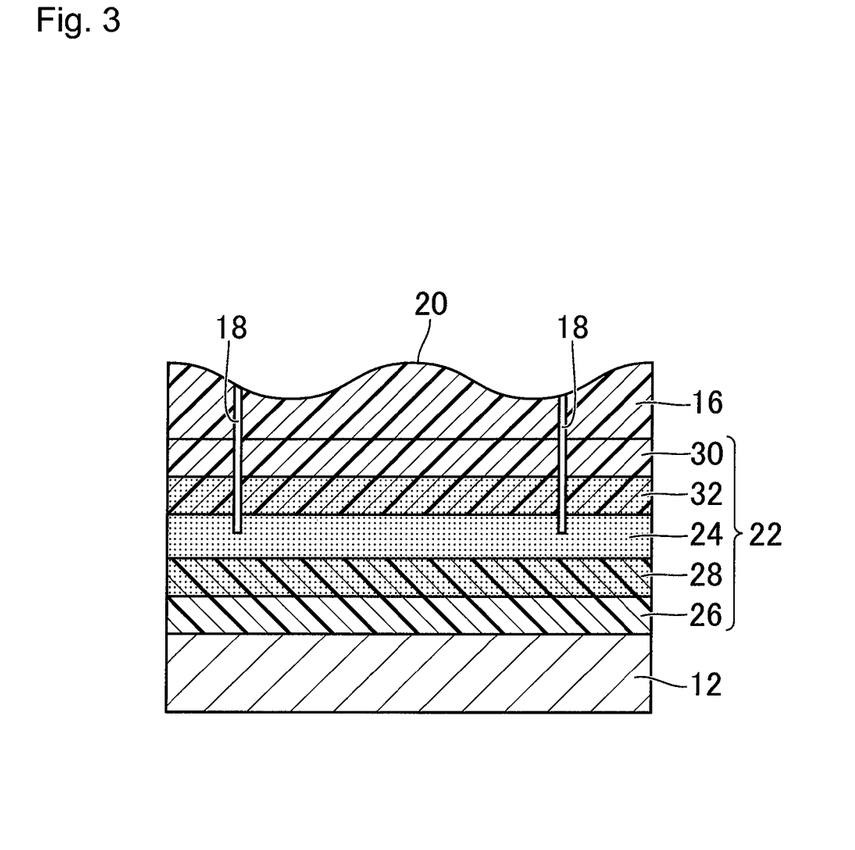
FIG. 3 is an enlarged schematic sectional view showing part of the mold for resin molding shown in FIG. 1.

FIG. 1 is a schematic sectional view of a mold for resin molding which is an embodiment of the present invention. FIG. 2 is an enlarged schematic sectional view of the mold for resin molding shown in FIG. 1. FIG. 3 is an enlarged schematic sectional view showing part of the mold for resin molding shown in FIG. 1.

The mold for resin molding 10 includes a mold 12, which is a die intended for vacuum molding to be used when forming a resin molded product that has projections and depressions of grain pattern (such as a leather grain pattern, a texture pattern, a wood grain pattern, a satin-finished pattern, a vein pattern, a scale pattern, a marble pattern, a minor-like pattern, a paint pattern, and a geometric pattern) on the surface. For example, the mold 12 is made of a steel material, a low-melting metal material such as aluminum and ZAS, a synthetic resin material, wood, or the like, and has a concave mold surface.

The mold 12 has ventilating throughholes 14 for exhausting air when pouring a melted resin into the mold-surface side during vacuum molding.

A design layer 16 is formed on the mold surface of the mold 12. The design layer 16 is made of a thermosetting resin sheet, and has ventilating throughholes 18 which couple (connect) to the ventilating throughholes 14. A die surface 20 having fine projections and depressions is provided on the surface. The design layer 16 is made from a mixture of the thermosetting resin and solid particles. The die surface 20 has the projections and depressions of grain pattern (such as a leather grain pattern, a texture pattern, a wood grain pattern, a satin-finished pattern, a vein pattern, a scale pattern, a marble pattern, a mirror-like pattern, a paint pattern, and a geometric pattern) on the surface.

A air permeable interposing layer 22 is interposed between the mold surface of the mold 12 and the design layer 16. The air permeable interposing layer 22 is formed by solidifying a fibrous air permeable member 24 such as paper, and has pore areas such as a gap to establish connection between the mold 12 and the design layer 16.

The ventilating throughholes 18 are formed in the design layer 16 by running through the same with wires so as to couple (connect) to the ventilating throughholes 14 of the mold 12 when the thermosetting resin making the design layer 16 is in a softened state.

The ventilating throughholes 14 of the mold 12 are formed to have a diameter greater than that of the ventilating throughholes 18 in the design layer 16.

The design layer 16 is made of a thermosetting resin that has a curing temperature of 250° C. or lower. Among examples of such thermosetting resins, epoxy resin and other insulative thermosetting resins that cure at around 150° C. and have heat insulation properties are used. It should be noted that the curing temperature of the thermosetting resin is selected depending on the allowable temperature limit heatproof temperature of the mold 12. For example, when the design layer 16 is formed on a mold 12 that is made of a low-melting material such as aluminum and ZAS, a thermosetting resin that cures within the temperature range of 110° C. to 150° C. is used depending on the allowable temperature limit heatproof temperature of the die material. This thermosetting resin in use shall also have a thermal conductivity of 0.18 to 0.21 W/m·K and a coefficient of thermal expansion of 3.2 to $4.6 \times 10^{-5}$/K. The design layer 16 is formed so as to have a thickness of 0.1 to 0.2 mm.

This design layer 16 is formed on both a core die and a cavity die, whereas the design layer 16 may only be formed on either one of the cavity and core dies.

To form such a design layer 16, the inner surface of the mold is degreased and cleaned.

The design layer 16 is formed by pasting a sheet of thermosetting resin such as epoxy resin or by applying the thermosetting resin so that the thermosetting resin layer is formed over the entire surface.

The design layer 16 is made of an epoxy resin, in which ceramic whiskers having a diameter of $5.0 \times 10^{-5}$ to $1.7 \times 10^{-2}$ mm, or preferably $5.0 \times 10^{-4}$ mm, and a length of 0.01 to 0.3 mm, or preferably 0.05 mm, are mixed. While 1 to 100 parts of the whiskers are mixed into 20 parts of the epoxy resin, the amount of whiskers to be mixed in is selected appropriately depending on the amount of fillers mixed in the resin. The epoxy resin is a composition containing a novolac type epoxy resin and a carboxyimide anhydride complex in combination.

The design layer 16 is made of the resin that mixes whiskers of 0.01 to 0.3 mm in length. Since the design layer 16 is made of the resin that does not contain glass fibers but fine whiskers having a diameter of $5.0 \times 10^{-5}$ to $1.7 \times 10^{-2}$ mm and a length of 0.01 to 0.3 mm, however, the whiskers can be oriented in all directions uniformly even if the design layer 16 is thin. Besides, the whiskers do not hamper the formation of the die surface having fine projections and depressions.

The design layer 16 has a thickness of 0.12 to 0.6 mm. Its surface makes a die surface 20 having a fine concavo-convex shape which is grained by the operation of pressing a patterned die surface having the leather grain pattern of 0.001 to 0.5 mm to be formed on molded products, i.e., so called inversion operation.

Aside from the foregoing, the design layer 16 may be made of such materials as epoxy resin, acrylic resin, polyacetal resin, polyamide resin, polyimide resin, polyurethane resin, polyester resin, polyethylene resin, polycarbonate resin, polypropylene resin, silicon resin, fluorine resin, melamine resin, urea resin, phenol resin, phthalic acid resin, styrene resins, cellulose resins, vinyl chloride resin, and vinyl acetate resin. These resins may be each used alone, or may be used in combination.

While epoxy resins are typically classified as thermosetting, they include ones of two-component curing type or reaction curing type, and even the epoxy resins of reaction curing type can make plastic deformation at high temperatures. This property can be utilized to form the design layer 16 in which a reaction-curing resin is added to a thermosetting resin as a plasticizer. Thermoplastic resins can also be used when molding resin molded products at temperatures below the softening point of the thermoplastic resins. Moreover, the design layer 16 may also be made from a thermosetting resin in which a thermoplastic resin is added as a plasticizer.

The fine concavo-convex shaped die surface 20 of the design layer 16 may be coated with a release layer containing ethylene tetrafluoride resin (typically referred to as Teflon™).

This mold for resin molding 10 keeps the die temperature during vacuum molding, so that the grain (the surface concavo-convex shape) of the fine concavo-convex shaped die surface 20 can be inverted favorably.

Next, the method for forming the design layer 16, or the method for forming the fine concavo-convex shaped die surface 20 in particular, will be described mainly with reference to FIG. 11.

Figure 11A:
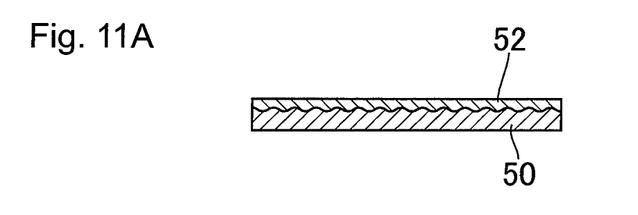
FIGS. 11A to 11C are schematic sectional views showing a method for manufacturing a resin sheet of the mold for resin molding shown in FIG. 1.
Figure 11B:
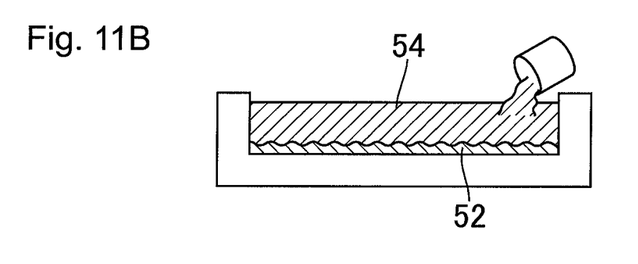
Figure 11C:
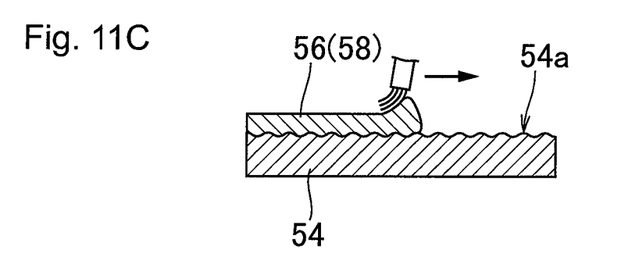

The forming method is the method for forming the design layer 16 by the processes in which: as shown in FIGS. 11A and 11B, a reverse mold 52 of silicon resin is created from a prototype 50 of leather or the like that has a leather grain pattern on the surface, and a master mold 54 of a resin for inversion is then created from the reverse mold 52 of silicon resin; (1) as shown in FIG. 11C, a resin sheet material 56 of whisker-containing epoxy resin is applied to and half-cured on the concavo-convex patterned surface 54a of the master mold 54 which has the concavo-convex pattern to be formed on resin molded products to thereby produce a resin sheet 58 intended for forming the design layer, having a concavo-convex shaped surface (a) to make the fine concavo-convex shaped die surface 20 on one side; (2) subsequently, the resin sheet 58 is temporarily attached to the air preamble interposing layer 22 of the mold 12; and in this state, the entire die is heated to cure the resin sheet 58.

The techniques available for forming the resin sheet 58 include: a slip blade method; a doctor blade method; a roll method which uses a roller instead of the doctor blade in the doctor blade method; a calendar method; a paper dipping method; a continuous pressure method; an injection molding method; a slice method of slicing a resin block; a squeegee method; a stretch method of stretching semi-cured resin; a shaving method of shaving a resin block; a press molding method; a centrifugal method of stretching resin by centrifugal force; an extrusion method of extruding a sheet of resin from an extruder; and a spray method of spraying resin to a certain thickness on the die surface.

Figure 12A:
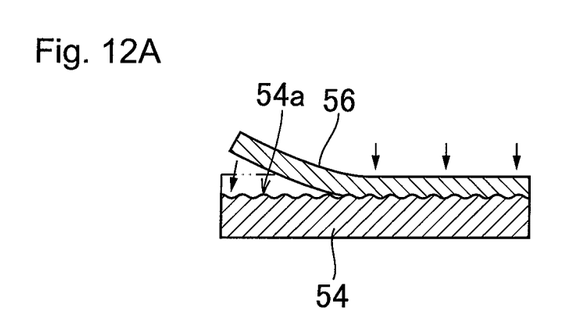
FIGS. 12A and 12B are schematic sectional views showing another method for manufacturing the resin sheet of the mold for resin molding shown in FIG. 1.
Figure 12B:
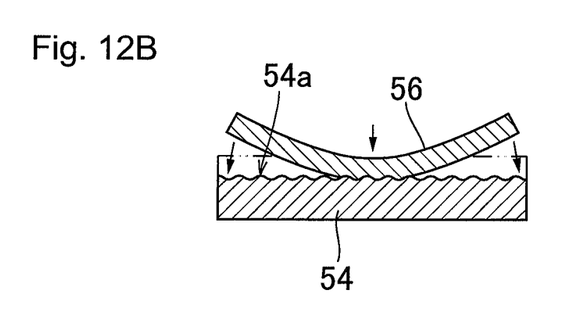

The step (1) includes: as shown in FIG. 12A, by utilizing the flexibility of the semi-cured resin sheet material 56, pressing the resin sheet material 56 gradually from its one side against the concavo-convex patterned surface 54a of the master mold 54; or as shown in FIG. 12B, pressing the resin sheet material 56 gradually from its center against the concavo-convex patterned surface 54a of the master mold 54 to put the resin sheet material 56 on the master mold 54 so that no air is introduced between the resin sheet material 56 and the concavo-convex patterned surface 54a.

In addition, in the step (2), the concavo-convex patterned die surface 20 of the resin sheet 58 may also be covered with a protective layer which is made of wax or other material that melts, burns out, or evaporates when heated to the curing temperature of the resin sheet 58.

The design layer 16 has a fine grain pattern, by inverting from the master mold 54, and has the effect of thermal insulation which improves the grain inversion rate of this mold for resin molding 10 to molded products.

The air permeable interposing layer 22 is formed by applying, drying, and curing dispersed pulp or other fibrous air permeable member 24 and the same resin (common material) as that of the design layer 16. This air permeable interposing layer also functions as an adhesive layer of 0.005 to 0.1 mm in thickness, and has pore areas all over.

The air permeable interposing layer 22 made of the fibrous air permeable member such as pulp and rock wool is formed, for example, in the following manner.

The common material (being the same resin as that of the design layer) is applied onto the mold 12 in a small thickness and dried to form a first air permeable adhesive layer 26. Then, the top of the first air permeable adhesive layer 26 is coated with the fibrous air permeable member 24 consisting of pulp, rock wool, or the like dispersed in water, followed by drying. Alternatively, if the air permeable member 24 is made of a packed material of fibers such as felt, the air permeable member 24 is pasted onto the first air permeable adhesive layer 26. Subsequently, the common material (being the same resin as that of the design layer) is applied to the surface of the air permeable member 24 further and dried to form the second air permeable adhesive layer, and then the design layer 16 is bonded thereto.

The air permeable interposing layer 22 must have holes of 0.01 mm or more and less than 0.2 mm all over, thereby making pore areas.

Pore areas of 0.2 mm or more can be formed up to about 20% of the entire surface. If pores of 0.2 mm or more cover more than 20% of the surface, however, the design layer 16 may be recessed in the surface.

The porosity falls within the range of 50% inclusive to 100% exclusive.

The air permeable interposing layer 22 secures proper ventilation characteristic by having pore areas all over. Thus, if a large amount of resin is impregnated into the air permeable member 24, the air permeable member 24 clogged up with the resin might drop in porosity and fail to exercise the ventilation property. The first air permeable adhesive layer 26 and the second air permeable adhesive layer 30 are then made sufficiently smaller than the air permeable member 24 in thickness, so that the amount of resin impregnated into the air permeable member 24 is adjusted not to impair the ventilation property.

The air permeable member 24 that forms the air permeable interposing layer 22 may be made of: various types of foamed materials (including such as PVA, melamine, and urethane); porous materials which are made from composite materials of resin and fine particles that disappear when heated to cure, such as sodium chloride, calcium carbonate, and sodium hydrogen carbonate; composite materials that contain resin, carbon, and sand so that the particles leave gaps therebetween; packed products of fibers such as pulp and rock wool; felt; or combinations of the these.

Figure 4:
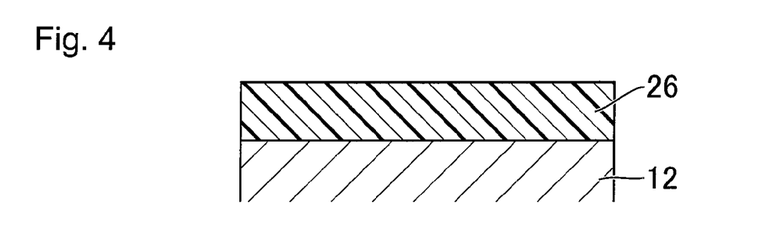
FIG. 4 is a schematic sectional view showing a method for manufacturing the mold for resin molding shown in FIG. 1.
Figure 5:
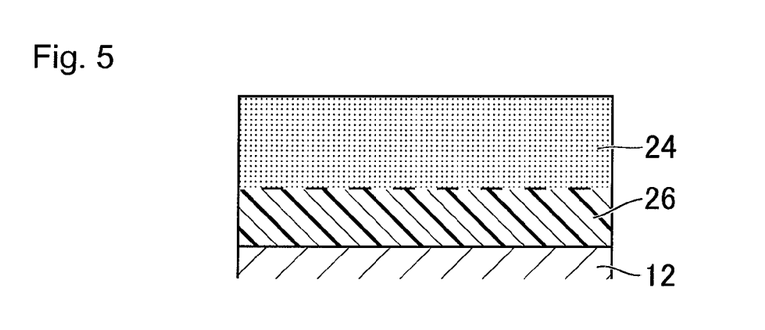
FIG. 5 is a schematic sectional view showing the method for manufacturing the mold for resin molding shown in FIG. 1.
Figure 6:
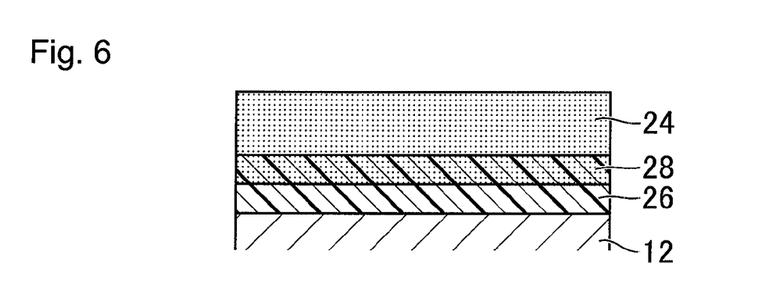
FIG. 6 is a schematic sectional view showing the method for manufacturing the mold for resin molding shown in FIG. 1.

Now, the adhesion between the air permeable interposing layer 22 and the mold 12 will be described mainly with reference to FIGS. 4 to 6.

Initially, a diluted resin is prepared by mixing the common material of the design layer 16 (common material being the same resin as that of the design layer), such as diluted resin prepared by mixing 20% to 70% by weight of solvent (ethyl cellosolve acetate) with epoxy resin. The diluted resin is sprayed onto the surface of the mold 12, thereby the first air permeable adhesive layer 26 is formed.

Next, the common material of the first air permeable adhesive layer 26 is dried and semi-cured, thereby the first air permeable adhesive layer 26 is formed.

Next, a porous air permeable member 24 such as a 0.5 mm-thick sponge sheet having continuous pores is temporarily bonded on the first air permeable adhesive layer 26 with a spray glue. The first air permeable adhesive layer 26 is heated to around 200° C. for curing. When heated, the dried resin of this first air permeable adhesive layer 26 once drops in viscosity before curing. The resin is thus impregnated into pores of the air permeable member 24 due to a capillary phenomenon, thereby forming a first air permeable impregnation layer 28. Subsequently, the resin is thermally cured, and the mold 12, the air permeable member 24, the first air permeable adhesive layer 26, and the first air permeable impregnation layer 28 are integrated.

It is therefore an essential condition that the air permeable member 24 is made of a ventilating material resistant to the resin of the first air permeable adhesive layer 26 and to the solvent contained in the resin.

For example, when the first air permeable adhesive layer 26 is made of epoxy resin, ethyl cellosolve acetate is used as the diluent solvent. If a thermosetting resin is selected as the resin material used for the first air permeable adhesive layer 26, however, substances that melt at the curing temperature cannot be used.

Figure 7:
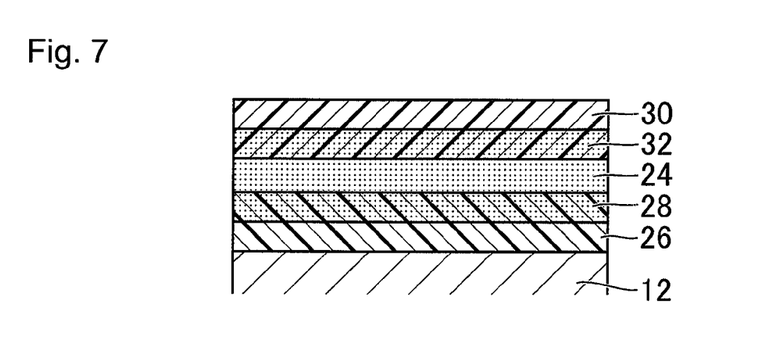
FIG. 7 is a schematic sectional view showing the method for manufacturing the mold for resin molding shown in FIG. 1.
Figure 8:
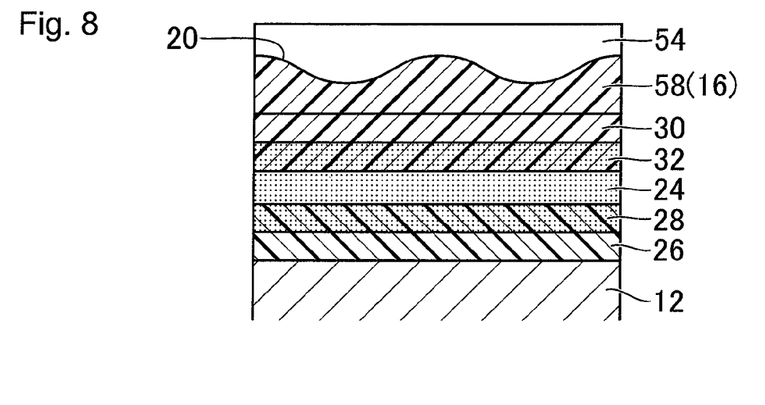
FIG. 8 is a schematic sectional view showing the method for manufacturing the mold for resin molding shown in FIG. 1.
Figure 9:
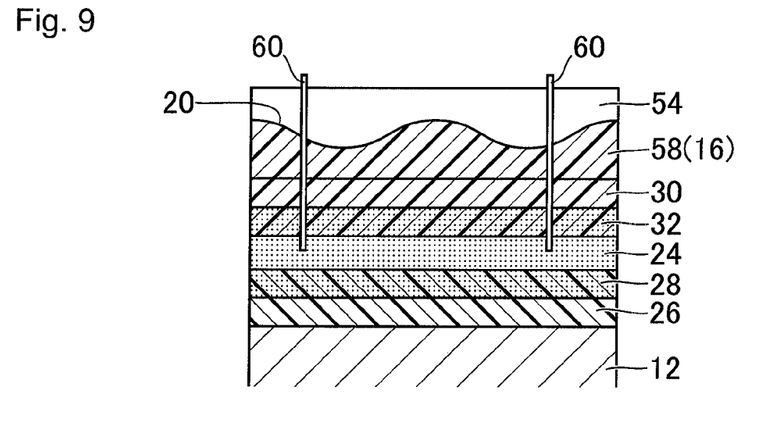
FIG. 9 is a schematic sectional view showing the method for manufacturing the mold for resin molding shown in FIG. 1.

The adhesion between the air permeable interposing layer 22 and the design layer 16 will now be described mainly with reference to FIGS. 7 to 9.

A diluted resin is prepared by mixing 20% to 70% by weight of solvent (ethyl cellosolve acetate) with epoxy resin, the same resin as that of the design layer 16. The diluted resin is sprayed onto the air permeable member 24 to form the second air permeable adhesive layer 30 on the air permeable member 24. Here, some of the resin is absorbed into the air permeable member 24, thereby a second air permeable impregnation layer 32 is formed. Subsequently, the resin is dried and cured to form the second air permeable adhesive layer 30 and the second air permeable impregnation layer 32.

Next, the resin sheet 58 for forming the design layer 16 is pasted onto the air permeable interposing layer 22 along with the master mold 54. Here, the resin sheet 58 for forming the design layer 16 is temporarily bonded on the second air permeable adhesive layer 30 with a spray glue.

For the purpose of securing the ventilating throughholes 18, preheating is performed while needles 60 or the like are stuck into the master mold 54, the resin sheet 58 for forming the design layer 16, the second air permeable adhesive layer 30, and the second air permeable impregnation layer 32, in such a manner as to penetrate therethrough.

Figure 10:
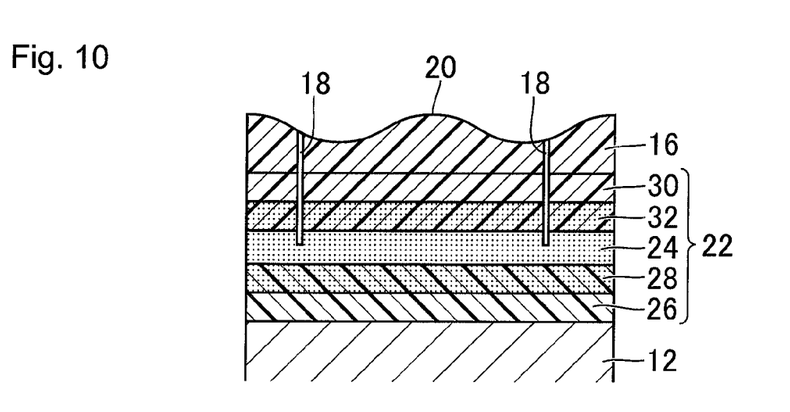
FIG. 10 is a schematic sectional view showing the method for manufacturing the mold for resin molding shown in FIG. 1.

Then, the master mold 54 and the needles 60 are removed from the design layer 16, followed by full heating at temperatures higher than in the preheating.

The second air permeable adhesive layer 30 is formed by applying the common material (being the same resin as that of the design layer) to the air permeable member 24 so that it is impregnated into the surface of the material for forming the air permeable member 24, and heating it to cure and adhere to the air permeable member 24 and the design layer 16 together. It is therefore an essential condition that the air permeable interposing layer 22 is made of a ventilating material resistant to the resin of the design layer 16 and to the solvent contained in the resin.

For example, when the design layer is made of epoxy resin, ethyl cellosolve acetate is used as the diluent solvent. If a thermosetting resin is selected as the resin used for the design layer 16, however, materials that melt at the curing temperature cannot be used.

The air permeable interposing layer 22 is composed of the air permeable member 24 that is made of fibrous material such as pulp, the first air permeable adhesive layer 26 that is formed by applying and curing the common resin material of the design layer 16, i.e. the same resin material as that of the design layer 16, formed on a side of the air permeable member 24 facing toward a side of the mold 12, the first air permeable impregnation layer 28 in which the common resin material of the design layer 16 which forms the first air permeable adhesive layer 26 is formed by impregnating with the air permeable member 24, the second air permeable adhesive layer 30 that is formed by applying and curing the common resin material of the design layer 16, i.e. the same resin material as that of the design layer 16, formed on a side of the air permeable member 24 facing toward the design layer 16, and the second air permeable impregnation layer 32 in which the common resin material of the design layer 16 which makes the second air permeable adhesive layer 30 is formed by being impregnated with the air permeable member 24.

For the method of forming the air permeable interposing layer 22 from a foamed air permeable member 24, it is formed by: forming a foamed sheet by means of using a foaming agent; bonding the air permeable member 24 made of the foamed sheet to the mold 12 with the same resin as that of the design layer 16; and bonding the air permeable member 24 made of the foamed sheet to the design layer 16 with the same resin as that of the design layer 16.

The foamed material desirably has continuous pores, whereas foamed material having single pores can also be used for ventilation purpose by linking the single pores to each other. In addition, it is possible to make a crack to the pore walls for ventilation by applying external force to the foamed material having single pores.

For the method of forming the air permeable interposing layer 22 from an air permeable member 24 of porous material, for example, it is formed by: making a porous member by means of thermally fusion bonding sand particles coated with phenol or other thermosetting resin; bonding the air permeable member 24 made of the porous member to the mold 12 with the same resin as that of the design layer 16; and bonding the air permeable member 24 made of the porous member to the design layer 16 with the same resin as that of the design layer 16.

The reason for using sand or other solids surface-coated with phenol resin is that the coating resin on the solid surfaces function as a binder so that the sand or other solids adhere to each other to form the air permeable member.

As another method of forming the air permeable interposing layer 22 from an air permeable member 24 of porous material, for example, particulates coated with resin may be used. An excessive amount of particulates having random shapes may be mixed into the resin, so that the resin, when cured, has gaps even inside. The porosity of the air permeable member 24 shall range from 50% inclusive to 100% exclusive.

The air permeable member 24, when using the same resin material (common material) as that of the first air permeable adhesive layer 26 and the second air permeable adhesive layer 30, is integrated with the first air permeable adhesive layer 26, the second air permeable adhesive layer 30 and the like by heating, and adhesivity is expressed. Some of the resin is absorbed into pores in the air permeable member 24 due to a capillary phenomenon, thereby providing an even higher adhesion.

For the fibrous air permeable member 24, paper, fabric, felt and the like may be used aside from those mentioned above.

As above, the projections and depressions on the surface of the air permeable interposing layer 22 are utilized to enhance the adhesion between the air permeable interposing layer 22, the mold 12, and the design layer 16 by an anchor effect. This secures the adhesion between the air permeable interposing layer 22 and the mold 12 and the adhesion between the air permeable interposing layer 22 and the design layer 16.

After the process of forming layer, the ventilating throughholes 18 are formed in the design layer 16 by such methods as: perforating with pointed tools like piano wires or other wires; thermally melting the design layer 16 with laser for perforation; and perforating by a perforating machine.

Furthermore, needles or the like may be stuck into the design layer 16 before the curing of the design layer 16, and removed from the thermally-cured design layer 16 to form the ventilating throughholes 18. For that purpose, the needles or the like can be removed or eliminated after or in the process of curing the resin so that the resin may not previously spread to the area forming the ventilating throughholes 18.

The ventilating throughholes 18 need not be made in the same positions as those of the ventilating throughholes 14 which are formed in the mold 12 in advance, as long as they have a depth to reach the air permeable interposing layer 22.

To obtain such a mold for resin molding 10, a thermosetting resin for the design layer 16, with a curing temperature of around 150° C., may be used, so that the firing temperature can be lowered to be 200° C. or less when forming the design layer 16. This reduces a difference in size to occur during firing due to a difference of the coefficient of thermal expansion between the mold 12 and the thermosetting resin, and thus suppresses the generation of cracks in the design layer 16. As a result, the steps of applying the thermosetting resin material in a small thickness and firing the same need not be repeated over and over, and the design layer 16 can be formed by respective single steps of pasting and curing the thermosetting resin material. This facilitates the formation of the design layer 16.

The design layer 16 is made of the thermosetting resin having a low curing temperature, and therefore, a thick design layer 16 can be formed easily by a single step of pasting. This facilitates repairing the design layer 16 even when damaged. The low firing temperature of the design layer 16 during formation suppresses deformation of the mold 12, and makes it possible to obtain resin molded products of precise shape. Moreover, the design layer 16 can also be formed on a mold 12 that is made of a material having a deforming temperature of around 300° C., such as aluminum. The thermosetting resin having a low curing temperature can also be used to form the design layer 16 not only on a mold 12 that is made of metal but on a mold 12 that is made of resin as well.

The air permeable adhesive layers may be bonded in the following way.

The bonding formation mechanism is identical both (a) when bonding the mold 12 and the air permeable interposing layer 22 and (b) when bonding the design layer 16 and the air permeable interposing layer 22. Thus, the bonding order may be such that (a) is cured first and (b) afterward, or (a) and (b) simultaneously.

The bonding forces are obtained by heating and curing the thermosetting resin, for example.

Figure 13:
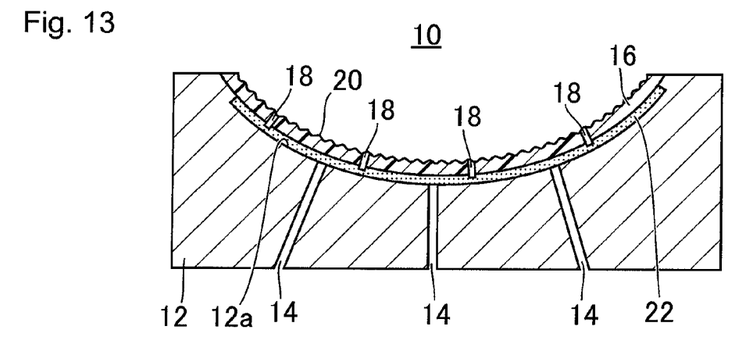
FIG. 13 is a schematic sectional view showing a mold for resin molding which is a modification of the mold for resin molding shown in FIG. 1.
Figure 14:
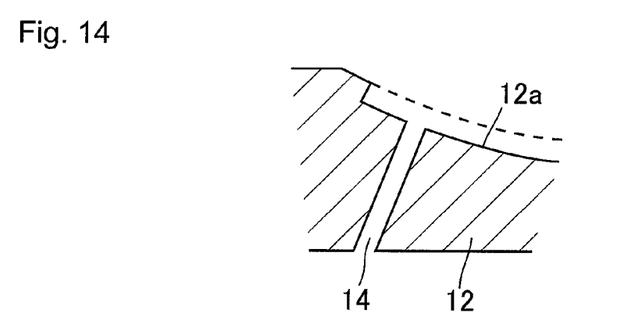
FIG. 14 is an enlarged schematic sectional view of the mold for resin molding shown in FIG. 13.
Figure 15:
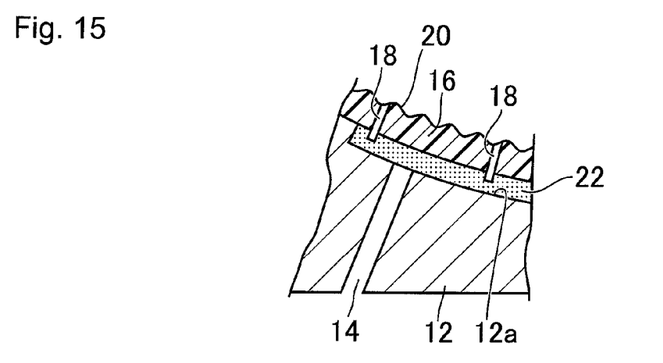
FIG. 15 is an enlarged schematic sectional view of the mold for resin molding shown in FIG. 13.

The air permeable interposing layer 22 need not be formed over the entire mold surface of the mold 12. As shown in FIGS. 13 to 15, a recess 12a may be formed in part of the mold surface of the mold 12 by carving the thickness of the air permeable interposing layer 22 so that the air permeable interposing layer 22 is formed in the part of the mold surface of the mold 12 by forming in the recess 12a.

When the air permeable interposing layer 22 is formed in the recess 12a, the first air permeable adhesive layer 26 and the first air permeable impregnation layer 28 may be not formed. In this instance, the air permeable member 24 made of a ventilating material greater than the recess 12a may be pressed into and fixed to form the air permeable interposing layer 22.

After the formation of the design layer 16, the ventilating throughholes 18 may be formed in arbitrary positions as long as they have a depth to reach the air permeable interposing layer 22. In such cases that the ventilating throughholes 18 are clogged up in the process of shape forming, perforation can thus be applied to other locations without cleaning the clogged holes.

The ventilating throughholes 14 in the mold 12 may be formed by installing hollow pipes, and the ventilating throughholes 18 may be formed by perforating the design layer 16 with wires from the hollow pipe side.

The ventilating throughholes 14 of the mold may be filled with sponge or other ventilating material so as to avoid clogging.

Embodiment 1

(1) Die Degreasing and Cleaning

The mold surface of a die 12 is degreased and cleaned with an organic solvent such as tetrachloroethylene, methanol, and thinner.

(2) Masking of Areas not to be Processed

Unused areas not to be processed are masked with a predetermined masking material, a sealing tape, or the like.

(3) Formation of Air Permeable Interposing Layer
(Ventilating Layer Combined with Adhesive Layers)

A diluted resin prepared by mixing epoxy resin and 20% to 70% by weight of solvent (ethyl cellosolve acetate) is sprayed onto the mold surface of the mold 12, thereby forming a first air permeable adhesive layer 26 over the mold surface of the mold 12.

This first air permeable adhesive layer 26 is then dried to form the first air permeable adhesive layer 26.

Next, for example, 100 parts by weight of epoxy resin is mixed with 50 to 98 parts by weight of random-shaped ceramic particulates having diameters of 0.01 to 0.5 mm. If the particulates are difficult to be mixed with the resin caused by high viscosity, 20 to 70 parts by weight of diluent solvent (ethyl cellosolve acetate) is added to the epoxy resin for viscosity adjustment.

Next, 100 parts by weight of the epoxy resin that contains 20 to 70 parts by weight of diluent solvent (ethyl cellosolve acetate), mixed with 50 to 98 parts by weight of the random-shaped ceramic particulates having diameters of 0.01 to 0.5 mm, is applied onto the first air permeable adhesive layer 26 to a thickness of 0.002 to 5 mm, thereby forming an air permeable member 24. The first air permeable adhesive layer 26 is heated to cure at approximately 200° C. The dried resin of this first air permeable adhesive layer 26, when heated, once drops in viscosity before curing. Thus, the resin is also impregnated into the pores in the air permeable member 24 due to a capillary phenomenon, thereby forming a first air permeable impregnation layer 28. Subsequently, the mold 12, the air permeable member 24, the first air permeable adhesive layer 26, and the first air permeable impregnation layer 28 are thermally cured for integration.

A diluted resin prepared by mixing epoxy resin and 20% to 70% by weight of solvent (ethyl cellosolve acetate) is sprayed onto the air permeable member 24, thereby forming a second air permeable adhesive layer 30 on the air permeable member 24. Here, some of the resin is absorbed into the air permeable member 24 to form a second air permeable impregnation layer 32.

(4) Formation of Design Layer

Initially, a reverse mold 52 of silicon is created from leather being a prototype 50.

Next, polyurethane resin being a resin sheet material 56 is poured onto the silicon reverse mold 52, thereby creating a master mold 54.

Epoxy resin is then applied (poured) onto the die surface of the polyurethane resin master mold 54, thereby forming a grain-patterned resin sheet 58.

This inversion from the prototype 50 such as leather is repeated to form the grained resin sheet 58 which makes a grained design layer consisting primarily of epoxy resin. The resultant is then bonded to the second air permeable adhesive layer 30 along with the master mold 54. Here, the grained resin sheet 58 is temporarily bonded with a spray glue. It is better for maintaining the die surface to paste the grained resin sheet 58 to the air permeable interposing layer 22 along with the master mold 54.

For the purpose of securing the ventilating throughholes 18, preheating is performed at approximately 100° C. while needles or the like are stuck into the master mold 54, the design layer 16, the second air permeable adhesive layer 30, and the second air permeable impregnation layer 32, in such a manner as to penetrate therethrough.

(5) Thermal Curing

Next, the master mold 54 and the needles 60 are removed. The semi-cured-state epoxy resin for making the second air permeable adhesive layer 30, diluted with ethyl cellosolve acetate (diluent solvent), is fully heated at approximately 200° C., and dried. The second air permeable adhesive layer 30 and the grained resin sheet 58 react to become rigid, thereby forming the design layer 16.

(6) Perforation

Aside from the foregoing method of perforating the design layer 16 with needles or the like for perforation, the design layer 16 may be perforated with the ventilating throughholes 18 having a depth to reach the air permeable interposing layer 22 at desired positions by using a laser or by mechanical means such as a punch.

The air permeable interposing layer has pore areas that couple to the ventilating throughholes 14 and the ventilating throughholes 18. The thicknesses of the respective layers are as follows.

The thickness of the air permeable interposing layer: 0.012 to 5.2 mm

The thickness of the design layer: 0.12 to 0.6 mm

The thicknesses of the first and second air permeable adhesive layers: 0.005 to 0.1 mm The total thickness of the foregoing three layers: 0.132 to 5.8 mm

Embodiment 2

(1) Die Degreasing and Cleaning

The mold surface of a die 12 is degreased and cleaned with an organic solvent such as tetrachloroethylene, methanol, or thinner.

(2) Masking of Areas not to be Processed

Unused areas not to be processed are masked with a predetermined masking material, a sealing tape, or the like.

(3) Formation of Air Permeable Interposing Layer (Ventilating Layer Combined with Adhesive Layers)

An epoxy resin diluted with ethyl cellosolve acetate (diluent solvent) is applied onto the mold surface of the mold 12 to a thickness of 0.002 to 5 mm, and semi-cured to form a first air permeable adhesive layer 26. Next, an air permeable member 24 made of pulp dispersed in water is applied to a thickness of 0.002 to 5 mm and dried to form a ventilating material layer. After the formation of the ventilating material layer, the epoxy resin diluted by ethyl cellosolve acetate (diluent solvent) is applied onto the surface to form the design layer 16 to a thickness of 0.005 to 0.1 mm, thereby forming a second air permeable adhesive layer 30.

(4) Formation of Design Layer

Initially, a reverse mold 52 of silicon is created from leather being a prototype 50.

Next, polyurethane resin being a resin sheet material 56 is poured onto the silicon reverse mold 52, thereby creating a master mold 54.

Epoxy resin is then applied (poured) onto the die surface of the polyurethane resin master mold 54, thereby forming a grain-patterned resin sheet 58.

This inversion from the prototype 50 such as leather is repeated to form the grained resin sheet 58 which makes a grained design layer 16 consisting primarily of epoxy resin. The resultant is then bonded to the second air permeable adhesive layer 30 along with the master mold 54. Here, the grained resin sheet 58 is temporarily bonded with a spray glue. It is better for maintaining the die surface to paste the grained resin sheet 58 to the air permeable interposing layer 22 along with the master mold 54.

For the purpose of securing the ventilating throughholes 18, preheating is performed at approximately 100° C. while needles or the like are stuck into the master mold 54, the design layer 16, the second air permeable adhesive layer 30, and the second air permeable impregnation layer 32, in such a manner as to penetrate therethrough.

(5) Thermal Curing

Next, the master mold 54 and the needles 60 are removed. The semi-cured-state epoxy resin for making the second air permeable adhesive layer 30, diluted with ethyl cellosolve acetate (diluent solvent), is fully heated at approximately 200° C., and dried. The second air permeable adhesive layer 30 and the grained resin sheet 58 react to become rigid, thereby forming the design layer 16.

(6) Perforation

Aside from the foregoing method of perforating the design layer 16 with needles or the like for perforation, the design layer 16 may be perforated with the ventilating throughholes 18 having a depth to reach the air permeable interposing layer 22 at desired positions by using a laser or by mechanical means such as a punch.

The air permeable interposing layer has pore areas that couple to the ventilating throughholes 14 and the ventilating throughholes 18. The thicknesses of the respective layers are as follows.

The thickness of the air permeable interposing layer: 0.012 to 5.2 mm

The thickness of the design layer: 0.12 to 0.6 mm

The thicknesses of the first and second air permeable adhesive layers: 0.005 to 0.1 mm The total thickness of the foregoing three layers: 0.132 to 5.8 mm

Embodiment 3

(1) Die Degreasing and Cleaning

The mold surface of a die 12 is degreased and cleaned with an organic solvent such as tetrachloroethylene, methanol, or thinner.

(2) Masking of Areas not to be Processed

Unused areas not to be processed are masked with a predetermined masking material, a sealing tape, or the like.

(3) Formation of Air Permeable Interposing Layer (Ventilating Layer Combined with Adhesive Layers)

(i) A silicon primer is applied to the mold, and thereafter a silicon adhesive or the like (silicon modified polymer) is applied or sprayed to form an adhesive layer. A thermosetting silicon resin is applied or sprayed thereon as a first air permeable adhesive layer 26.

(ii) A ventilating material layer is formed before the first air permeable adhesive layer dries up. A sponge sheet of 0.5 mm-thick having continuous pores is installed. For the purpose of making pore areas, a sponge sheet having a thickness of 0.002 to 5 mm is suitably used.

(iii) The first air permeable adhesive layer 26 is heated to cure at approximately 150° C. The undried (flowable) resin that is impregnated into pores of the ventilating material layer due to a capillary phenomenon is thus cured thermally, thereby integrating the ventilating material layer and the first air permeable adhesive layer 26.

(iv) The first air permeable adhesive layer 26 is formed on the ventilating material layer, followed by drying (some of the resin is absorbed into the ventilating material layer to form the first air permeable impregnation layer 28).

(4) Formation of Design Layer

On the ventilating material layer impregnated with some resin, the thermosetting silicon resin is applied or sprayed to form a second air permeable adhesive layer 30. Before the second air permeable adhesive layer 30 dries up, a grained resin sheet 58 consisting primarily of the thermosetting silicon resin is bonded thereto. In this instance, the second air permeable adhesive layer 30 for bonding has flowability and thus adheres because of surface tension.

The grained resin sheet 58 is molded as in the embodiment 1.

(5) Thermal Curing

Next, the master mold 54 and the needles 60 are removed. The semi-cured-state thermosetting silicon resin for making the second air permeable adhesive layer 30 is fully heated at approximately 150° C., and dried. The second air permeable adhesive layer 30 and the grained resin sheet 58 react to cure, thereby forming the design layer 16.

(6) Perforation

Aside from the foregoing method of perforating the design layer 16 with needles or the like for perforation, the design layer may be perforated with the ventilating throughholes having a depth to reach the air permeable interposing layer at desired positions by using a laser or by mechanical means such as a punch.

The air permeable interposing layer has pore areas that couple to the ventilating throughholes 14 and the ventilating throughholes 18. The thicknesses of the respective layers are as follows.

The thickness of the air permeable interposing layer: 0.012 to 5.2 mm

The thickness of the design layer: 0.12 to 0.6 mm

The thicknesses of the first and second air permeable adhesive layers: 0.005 to 0.1 mm The total thickness of the foregoing three layers: 0.132 to 5.8 mm Embodiment 4

(1) Die Degreasing and Cleaning

The mold surface of a die 12 is degreased and cleaned with an organic solvent such as tetrachloroethylene, methanol, and thinner.

(2) Masking of Areas not to be Processed

Unused areas not to be processed are masked with a predetermined masking material, a sealing tape, or the like.

(3) Formation of Air Permeable Interposing Layer
(Ventilating Layer Combined with Adhesive Layers)

(i) A silicon primer is applied to the mold, and thereafter a silicon adhesive or the like (silicon modified polymer) is applied or sprayed to form an adhesive layer. A silicon resin of cold setting type (base resin:curing agent=100:0.3 to 0.5) is applied or sprayed thereon as a first air permeable adhesive layer 26.

(ii) A ventilating material layer is formed before the first air permeable adhesive layer 26 cures. For example, a felt fabric of 0.5 mm-thick is installed. For the purpose of making pore areas, a felt fabric having a thickness of 0.002 to 5 mm is suitably used.

(iii) The silicon resin of cold setting type (base resin:curing agent=100:0.3 to 0.5) is applied or sprayed onto the ventilating material layer, thereby forming a second air permeable adhesive layer 30. In this instance, some of the resin is absorbed into the air permeable member 24 to form a second air permeable impregnation layer 32.

(4) Formation of Design Layer

A grained resin sheet 58 made of the cold-setting silicon resin (base resin:curing agent=100:0.3 to 0.5) in a semi-cured state is bonded to the top of the semi-cured second air permeable adhesive layer 30 made of the cold-setting silicon resin (base resin:curing agent=100:0.3 to 0.5) along with the master mold 54.

The grained resin sheet 58 is molded as in the embodiment 1.

(5) Curing

Next, the master mold 54 and the needles 60 are removed. The semi-cured-state cold-setting silicon resin (base resin:curing agent=100:0.3 to 0.5) for making the second air permeable adhesive layer 30 is cured so that the second air permeable adhesive layer 30 and the grained resin sheet 58 react to cure, thereby forming the design layer 16.

(6) Perforation

Aside from the foregoing method of perforating the design layer 16 with needles or the like for perforation, the design layer may be perforated with the ventilating throughholes having a depth to reach the air permeable interposing layer at desired positions by using a laser or by mechanical means such as a punch.

The air permeable interposing layer has pore areas that couple to the ventilating throughholes 14 and the ventilating throughholes 18. The thicknesses of the respective layers are as follows.

The thickness of the air permeable interposing layer: 0.012 to 5.2 mm

The thickness of the design layer: 0.12 to 0.6 mm

The thicknesses of the first and second air permeable adhesive layers: 0.005 to 0.1 mm The total thickness of the foregoing three layers: 0.132 to 5.8 mm Embodiment 5

(1) Die Degreasing and Cleaning

The mold surface of a die 12 is degreased and cleaned with an organic solvent such as tetrachloroethylene, methanol, and thinner.

(2) Masking of Areas not to be Processed

Unused areas not to be processed are masked with a predetermined masking material, a sealing tape, or the like.

(3) Formation of Air Permeable Interposing Layer
(Ventilating Layer Combined with Adhesive Layers)

(i) A urethane primer is applied to the mold 12, and thereafter a urethane adhesive or the like is applied or sprayed to form an adhesive layer. A flexible urethane resin (base resin:curing agent=3:1) is applied or sprayed thereon as a first air permeable adhesive layer 26.

(ii) A ventilating material layer is formed before the first air permeable adhesive layer 26 cures. For example, a sponge sheet of 0.5 mm-thick having continuous pores is installed. For the purpose of making pore areas, a sponge sheet having a thickness of 0.002 to 5 mm is suitably used.

(iii) The flexible urethane resin (base resin:curing agent=3:1) is applied or sprayed onto the ventilating material layer, thereby forming a second air permeable adhesive layer 30. In this instance, some of the resin is absorbed into the ventilating material layer to form a second air permeable impregnation layer 32.

(4) Formation of Design Layer

A grained resin sheet made of the flexible urethane resin (base resin:curing agent=3:1) in a semi-cured state is bonded to the top of the semi-cured second air permeable adhesive layer 30 made of the flexible urethane resin (base resin:curing agent=3:1).

The grained resin sheet 58 is molded as in the embodiment 1.

(5) Curing

Next, the master mold 54 and the needles 60 are removed. The semi-cured-state flexible urethane resin (base resin:curing agent=3:1) for making the second air permeable adhesive layer 30 is cured so that the second air permeable adhesive layer 30 and the grained resin sheet 58 react to cure, thereby forming the design layer 16.

(6) Perforation

Aside from the foregoing method of perforating the design layer 16 with needles or the like for perforation, the design layer may be perforated with the ventilating throughholes having a depth to reach the air permeable interposing layer at desired positions by using a laser or by mechanical means such as a punch.

The air permeable interposing layer has pore areas that couple to the ventilating throughholes 14 and the ventilating throughholes 18. The thicknesses of the respective layers are as follows.

The thickness of the air permeable interposing layer: 0.012 to 5.2 mm

The thickness of the design layer: 0.12 to 0.6 mm

The thicknesses of the first and second air permeable adhesive layers: 0.005 to 0.1 mm The total thickness of the foregoing three layers: 0.132 to 5.8 mm When using the foregoing mold for resin molding for vacuum molding, a melted resin such as polypropylene is poured or a thermally-softened sheet material of polyurethane or the like is placed into the mold for resin molding. The mold for resin molding is then exhausted through the ventilating throughholes 14 so that the melted resin is sucked to the surface of the design layer for molding, thereby forming a resin molded product.

The invention claimed is:

1. A mold for resin molding, comprising:
a mold;
a design layer formed inside the mold; and
an air permeable interposing layer configured to form the design layer on an inner surface of the mold;
the mold having a ventilating throughhole;
a die surface having fine projections and depressions being provided on the surface;
the design layer having a thermosetting resin layer formed by pasting a sheet of thermosetting resin or by applying the thermosetting resin over the entire surface, having projections and depressions on a surface of the thermosetting resin layer, and forming a ventilating throughhole so as to connect to the ventilating throughhole of the mold;
a curing temperature of the thermosetting resin of the design layer being selected based on an allowable temperature limit heatproof temperature of the mold;
the design layer having a thickness of between 0.1 mm and 0.2 mm, and the design layer being made of resin that mixes whiskers;
the air permeable interposing layer having a first air permeable adhesive layer to be bonded to an inner surface of the mold, which is formed by drying after applying the same thermosetting resin as that of the design layer to the mold in a thin layer as compared with an air permeable member without losing any ventilation characteristic, an air permeable member formed by drying after coating with the fibrous air permeable member dispersed in water on the top of the first air permeable adhesive layer, and the first air permeable impregnation layer formed by a resin forming the first air permeable adhesive layer, impregnated with the air permeable member and heated to cure with the first air permeable adhesive layer;
the air permeable interposing layer having a second air permeable adhesive layer to be bonded to the design layer, which is formed by drying after applying the same thermosetting resin as the thermosetting resin forming the design layer to the surface of the air permeable member in a thin layer as compared with an air permeable member without losing any ventilation characteristic, and a second air permeable impregnation layer which is formed by a resin forming the second air permeable adhesive layer, impregnated with the air permeable member and heated to cure with the second air permeable adhesive layer;
the design layer connecting to an inner surface of the mold by interposing the air permeable interposing layer so that a ventilating throughhole of the design layer, a ventilating throughhole of the mold and a ventilating pore of the air permeable interposing layer are connected to each other;
the air permeable interposing layer having holes of between 0.01 mm and 0.2 mm forming one or more pore areas;
a porosity of the one or more pore areas being within the range of 50% inclusive to 100% exclusive; and
the air permeable member including a ventilating material that is resistant to the resin of the first air permeable adhesive layer.

2. A mold for resin molding, comprising:
a mold;
a design layer formed inside the mold; and
an air permeable interposing layer for forming the design layer on an inner surface of the mold;
the mold having a ventilating throughhole;
a die surface having fine projections and depressions being provided on the surface;
the design layer having a thermosetting resin layer formed by pasting a sheet of thermosetting resin or by applying the thermosetting resin over the entire surface, having projections and depressions on a surface of the thermosetting resin layer, and forming a ventilating throughhole so as to connect to the ventilating throughhole of the mold;
a curing temperature of the thermosetting resin of the design layer being selected based on an allowable temperature limit heatproof temperature of the mold;
the design layer having a thickness of between 0.1 mm and 0.2 mm, and the design layer being made of resin that mixes whiskers;
the air permeable interposing layer having a first air permeable adhesive layer to be bonded to an inner surface of the mold, which is formed by drying after applying the same thermosetting resin as that of the design layer to the mold in a thin layer as compared with an air permeable member without losing any ventilation characteristic;
the air permeable interposing layer having a first air permeable impregnation layer, which is formed by bonding an air permeable member made of a sponge sheet with continuous pores on the first air permeable adhesive layer, or pasting an air permeable member made from a packed material of fibers onto the first air permeable adhesive layer, and the first air permeable impregnation layer formed by a resin forming the first air permeable adhesive layer, impregnated with the air permeable member and heated to cure with the first air permeable adhesive layer;

the air permeable interposing layer having a second air permeable adhesive layer to be bonded to the design layer, which is formed by applying the same thermosetting resin as that of the design layer on the air permeable member, and the second air permeable impregnation layer formed by a resin forming the second air permeable impregnation layer, impregnated with the air permeable member and heated to cure with the second air permeable adhesive layer;

the design layer connecting to an inner surface of the mold by interposing the air permeable interposing layer so that a ventilating throughhole of the design layer, a ventilating throughhole of the mold and a ventilating pore of the air permeable interposing layer are connected to each other;

the air permeable interposing layer having holes of between 0.01 mm and 0.2 mm forming one or more pore areas;

a porosity of the one or more pore areas being within the range of 50% inclusive to 100% exclusive; and the air permeable member including a ventilating material that is resistant to the resin of the first air permeable adhesive layer.

3. A mold for resin molding, comprising:

a mold;

a design layer formed inside the mold; and an air permeable interposing layer for forming the design layer on an inner surface of the mold;

the mold having a ventilating throughhole;

a die surface having fine projections and depressions being provided on the surface;

the design layer having a thermosetting resin layer formed by pasting a sheet of thermosetting resin or by applying the thermosetting resin over the entire surface, having projections and depressions on a surface of the thermosetting resin layer, and forming a ventilating throughhole so as to connect to the ventilating throughhole of the mold;

a curing temperature of the thermosetting resin of the design layer being selected based on an allowable temperature limit heatproof temperature of the mold;

the design layer having a thickness of between 0.1 mm and 0.2 mm, and the design layer being made of resin that mixes whiskers;

the air permeable interposing layer having a first air permeable adhesive layer to be bonded to an inner surface of the mold, which is formed by drying after applying the same thermosetting resin as that of the design layer to the mold in a thin layer as compared with an air permeable member without losing any ventilation characteristic;

the air permeable interposing layer having a porous air permeable member with a ventilation characteristic, which is formed by an air permeable member made of a foamed material having ventilation characteristic or by thermally fusing particulates coated with thermosetting resin on the surface of sand or random-shaped ceramic particulates, and a first air permeable impregnation layer formed by a resin forming the first air permeable adhesive layer, impregnated with the air permeable member and heated to cure with the first air permeable adhesive layer;

the air permeable interposing layer having a second air permeable adhesive layer to be bonded to the design layer, which is formed by drying after applying the same thermosetting resin as the thermosetting resin forming the design layer to the surface of the air permeable member in a thin layer as compared with an air permeable member without losing any ventilation characteristic and the second air permeable impregnation layer formed by a resin forming the second air permeable adhesive layer, impregnated with the air permeable member and heated to cure with the second air permeable adhesive layer;

the design layer connecting to an inner surface of the mold by interposing the air permeable interposing layer so that a ventilating throughhole of the design layer, a ventilating throughhole of the mold and a ventilating pore of the air permeable interposing layer are connected to each other;

the air permeable interposing layer having holes of between 0.01 mm and 0.2 mm forming one or more pore areas;

a porosity of the one or more pore areas being within the range of 50% inclusive to 100% exclusive; and the air permeable member including a ventilating material that is resistant to the resin of the first air permeable adhesive layer.

4. The mold for resin molding according to claim 1, wherein the projections and depressions of the design layer make a grain pattern on the inner surface.

5. The mold for resin molding according to claim 1, wherein the air permeable interposing layer is arranged in a recess formed in part of the mold surface of the mold.

6. The mold for resin molding according to claim 1, wherein the air permeable interposing layer is bonded to a mold surface of the mold and to the design layer with an adhesive material that forms the design layer.

7. The mold for resin molding according to claim 1, wherein the air permeable member contains any one or more of a foamed material, a porous material, and a fibrous material.

8. The mold for resin molding according to claim 2, wherein the air permeable member contains any one or more of a foamed material, a porous material, and a fibrous material.

9. The mold for resin molding according to claim 3, wherein the air permeable member contains any one or more of a foamed material, a porous material, and a fibrous material.

10. The mold for resin molding according to claim 1, wherein the air permeable member contains any one or more of a foamed material, a porous material, and a fibrous material, the air permeable member being bonded to the mold and to the design layer with an adhesive material.

11. The mold for resin molding according to claim 2, wherein the air permeable member contains any one or more of a foamed material, a porous material, and a fibrous material, the air permeable member being bonded to the mold and to the design layer with an adhesive material.

12. The mold for resin molding according to claim 3, wherein the air permeable member contains any one or more of a foamed material, a porous material, and a fibrous material, the air permeable member being bonded to the mold and to the design layer with an adhesive material.

13. The mold for resin molding according to claim 1, wherein the design layer is made of a thermosetting resin having a curing temperature of 250° C. or lower.

* * * * *